(12) United States Patent
Ruzga

(10) Patent No.: US 6,710,350 B2
(45) Date of Patent: Mar. 23, 2004

(54) RADIATION DETECTOR WITH MICROPHOTONIC OPTICAL SWITCHES TO ROUTE LIGHT IN AN IMAGING SYSTEM

(75) Inventor: Richard J. Ruzga, Mukwonago, WI (US)

(73) Assignee: GE Medical Systems Information Technologies, Inc., Milwaukee, WI (US)

( * ) Notice: Subject to any disclaimer, the term of this patent is extended or adjusted under 35 U.S.C. 154(b) by 146 days.

(21) Appl. No.: 09/683,935

(22) Filed: Mar. 5, 2002

(65) Prior Publication Data

US 2003/0168603 A1 Sep. 11, 2003

(51) Int. Cl.$^7$ ................................................ G01T 1/20
(52) U.S. Cl. ..................... 250/368; 250/366; 250/367
(58) Field of Search ........................ 250/368, 366, 250/367

(56) References Cited

U.S. PATENT DOCUMENTS

| | | |
|---|---|---|
| 5,367,584 A | 11/1994 | Ghezzo et al. |
| 5,367,585 A | 11/1994 | Ghezzo et al. |
| 5,391,878 A * | 2/1995 | Petroff ........................ 250/367 |
| 5,862,276 A | 1/1999 | Karras |
| 5,907,646 A | 5/1999 | Kitamura |
| 5,945,898 A * | 8/1999 | Judy et al. ..................... 335/78 |
| 6,188,814 B1 | 2/2001 | Bhalla |
| 6,195,478 B1 | 2/2001 | Fouquet |
| 6,275,326 B1 | 8/2001 | Bhalla et al. |

FOREIGN PATENT DOCUMENTS

JP    2001-337083 A   * 12/2001   .......... G01N/21/64

OTHER PUBLICATIONS

"The Microphotonics Revolution," Technology Review, Jul./Aug. 2000, pp. 38–44.

* cited by examiner

*Primary Examiner*—Constantine Hannaher
(74) *Attorney, Agent, or Firm*—George E. Haas; Quarles & Brady LLP

(57) ABSTRACT

An Radiation detector employs one or more arrays of microphotonic light transmission devices to selectively control the flow of light from different detection sites in a scintillator into an optical conduit. For example the microphotonic light transmission devices may be microelectromechanical steerable mirrors or light gates. Instead of employing a separate detector element to convert the light from each site into an electrical signal that is then switched into a data acquisition system, the present detector assembly switches the light into the optical conduit to the data acquisition system.

27 Claims, 2 Drawing Sheets

RADIATION DETECTOR WITH MICROPHOTONIC OPTICAL SWITCHES TO ROUTE LIGHT IN AN IMAGING SYSTEM

BACKGROUND OF INVENTION

The present invention relates to imaging apparatus which employ an invisible form of radiation, such as x-rays, to form an image of an object; and more particularly, to detector arrays that convert the invisible radiation into visible light which then is converted into electrical signals.

A computed tomography system employs an x-ray source to project a cone-shaped beam through the object being imaged, such as a medical patient. Upon exiting the object, the x-rays impinge upon a two-dimensional array of radiation detectors. The intensity of the transmitted radiation which strikes each radiation detector is dependent upon the attenuation of the x-ray beam by the object and each detector produces a separate electrical signal that is a measurement of the beam attenuation. The detector array has multiple rows of detectors to acquire x-rays attenuation measurements in a plurality of planar slices through the object and the attenuation measurements from the detectors in a given row produce the transmission profile.

The typical radiation detector comprises a scintillator which is a block of crystalline material the emits visible light upon being struck by x-rays. Thus x-rays striking one surface of the scintillator produce light which is emitted from the opposite surface. A body of semiconductor material is attached to that opposite surface by a transparent epoxy. A two dimensional array of photodiodes, arranged in rows and columns, is formed in the semiconductor body to respond to the light received from the scintillator. A plurality of row electrical conductors connect the photodiodes in each row together and plurality of column electrical conductors connect the photodiodes in each column together. Thus an x-ray attenuation measurement can be acquired from a given photodiode by selecting the row and column electrical conductor to which that photodiode is connected. A transistor switch assembly is used to sequentially access each photodiode in the array and transfer the corresponding electrical signal to a data acquisition system (DAS).

The X-ray source and detector array in a conventional CT system are rotated on a gantry around the object in an imaging plane and so that the angle at which the x-ray beam intersects the object constantly changes. A group of x-ray attenuation measurements from the detector array at a given angle is referred to as a "view" and a "scan" of the object comprises a set of views made at different angular orientations during one revolution of the x-ray source and detector. The x-ray attenuation data is processed to construct an image that corresponds to a plurality of two dimensional slices taken through the object. The prevailing method for reconstructing an image from that data is referred to in the art as the filtered back projection technique. This process converts the attenuation measurements from a scan into integers called "CT numbers" or "Hounsfield units", which are used to control the brightness of a corresponding pixel on an image monitor.

In an unrelated field of technology, optical data communication, microphotonic devices have been developed to route light beams which are modulated with signals carrying data, audio or video. Traditionally, when the signal had to be switched from one optical fiber to another in order to direct the information to the intended recipient location, the optical signal was transformed into an electrical signal which was routed through conventional electrical switching circuits. The electrical signal then was converted back into a modulated light beam for transmission through another optical fiber onward to the recipient location. The conversion between optical and electrical domains slowed the transmission.

In response, microphotonic switching circuits were developed, as described in an article by Peter Fairley entitled "The Microphotonics Revolution", *Technology Review*, July/August 2000, pages 38–64. Microphotonic switching circuits employ tiny electrically operated devices which direct light along a desired path by reflecting or gating the light. For example, a microphotonic switch for routing telecommunication signals from an incoming optical fiber to one of a plurality of outgoing optical fibers utilizes a matrix of microscopic mirrors. Each mirror is electrically tilted independently to switch the light beam between a desired pair of fibers. Thus the microphotonic switches eliminate the need to convert the incoming optical signal into an electrical signal for switching and then reconvert the electrical signal into an optical signal for transmission through the outgoing fiber.

SUMMARY OF INVENTION

An radiation detector for an imaging apparatus, such as a computed tomography system for example, utilizes a scintillator to convert invisible radiation into light. A light transmission assembly is coupled to the scintillator, thereby defining a plurality of detection sites in the scintillator. An optical conduit leads from the light transmission assembly to data processing circuits. The light transmission assembly has a plurality of microphotonic routing matrices, each one is selectively operable to control the flow of light from one of the detection sites to the optical conduit.

The microphotonic routing matrixes may comprise a plurality of electrically steerable mirrors to reflect the light from the respective detection sites into the optical conduit. In another version, the microphotonic routing matrices comprise a plurality of light gates which are independently operable to transmit the light between the scintillator detection sites and the optical conduit. For example, the light gates may be formed by liquid crystal elements, the light transparency of which is electrically controllable.

In one embodiment, microelectromechanical (MEMS) steerable mirrors is located in a two-dimensional array adjacent to the scintillator. Activation of a given mirror, tilts that device to reflect the light emitted from the respective detection site of the scintillator along a defined path toward a linear array of microelectromechanical steerable mirrors. Each mirror in the linear array receives the reflected light from the MEMS devices in a given row of the two-dimensional array and when tilted directs that light into the optical conduit. By sequentially operating the mirrors in each array, light from every detection site is sent through the optical conduit.

DETAILED DESCRIPTION

The present invention is being described in the context of a computed tomography (CT) imaging system for medical purposes. However, the inventive concepts have application to other imaging modalities, such as conventional x-ray equipment, nuclear medicine imagers and positron emission tomography (PET) for example, which convert another form of radiation into visible light. Furthermore, the present invention is not confined to medical imaging systems and may be used in other fields, such as for industrial applications.

Figure 1:
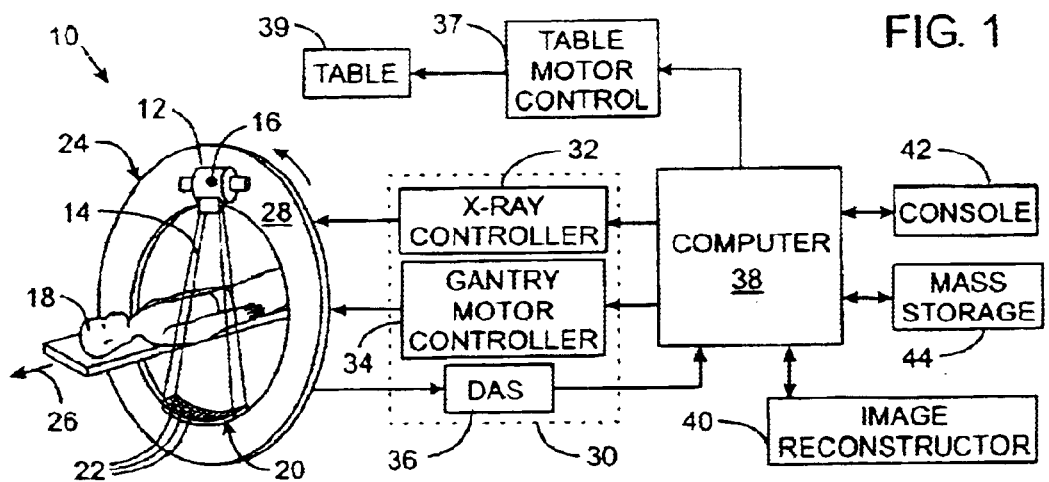
FIG. 1 is a block schematic diagram of a CT imaging system which incorporates the present invention.

With reference to FIG. 1, a CT imaging system 10 includes an x-ray source 12 oriented to project a cone beam of x-rays 14 through a patient 18 and onto a two-dimensional detector array 20. The detector array 20 includes a number of detection sites 22 arranged over the area of the detector array in generally perpendicular columns and rows to detect a projected image of the x-rays 14 passing through the patient 18.

The x-ray source 12 and the two-dimensional detector array 20 are mounted on opposite sides of a gantry 24 so as to rotate about an axis of rotation 26 generally positioned within the patient 18. The axis of rotation 26 forms the z-axis of a Cartesian coordinate system having its origin centered within the cone beam 14. The plane defined by the x and y axes of this coordinate system thus defines a plane of rotation, specifically the gantry plane 28 of the gantry 24.

The two-dimensional detector array 20 is arranged as a section of the surface of a sphere having a center at the origin of the cone beam 14 in the source 12, and its array of detection sites 22 is oriented to receive and make intensity measurements along the rays of the cone beam. The detection sites 22 are arranged in rows which extend along an in-slice dimension. Each row may include, for example, 1,000 separate detection sites, and the detector array 20 includes 16 rows disposed along the slice dimension. The detector array will be described in greater detail hereinafter.

Referring still to FIG. 1, the control subsystem of the CT imaging system 10 has a gantry associated control modules 30 which include: a controller 32 which provides power and timing signals to the x-ray source 12, and a gantry motor controller 34 to control the rotational speed and position of the gantry 24. A data acquisition system (DAS) 36 receives projection data from the detector array 20 along with information identifying the position in the array from which each item of x-ray attenuation data originated. The x-ray controller 32, the gantry motor controller 34 and the data acquisition system 36 are connected to computer 38. The computer 38 also governs operation of a table motor control 37 which drives a motor that moves the patient table 39 along the z26.

The computer 38 is a general purpose minicomputer programmed to acquire and manipulate projection data as will be described in detail below. The computer 38 is connected to an image reconstructor 60 which performs high speed image reconstruction according to methods known in the art.

The computer 38 receives commands and scanning parameters via operator console 62 which is generally a CRT display and keyboard that enables an operator to enter parameters for the CT scan and to display the reconstructed image. A mass storage device 64 provides a means for storing operating programs.

During data acquisition, the CT imaging system 10 functions conventionally holding the table 39 stationary as the x-ray source 12 and detector array 20 make a complete revolution around the gantry 24 about the axis of rotation 26. At each of a plurality of angular positions during that revolution, attenuation data from all the detection sites 22 in array 20 are stored in the mass memory 64. Upon completion of a full revolution, the computer commands the table motor control 37 to advance the table 39 to another position along the z-axis 26 and another rotational scan of the patient 18 is preformed. This process is repeated until the desired portion of the patient 18 has been fully scanned.

Thereafter, a conventional image reconstruction technique, such as a three-dimension backprojection process, is employed to form slice images of the patient.

Figure 2:
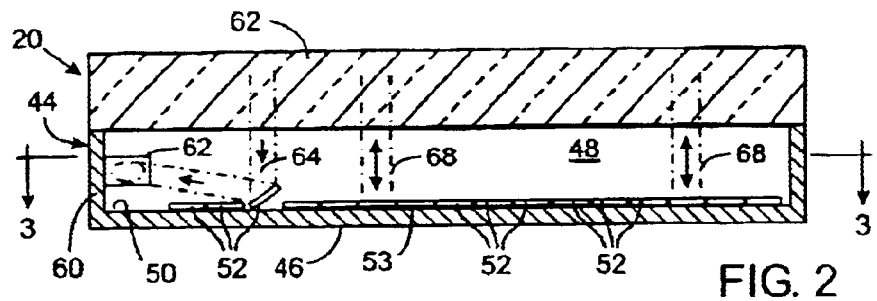
FIG. 2 is a cross section through a first embodiment of an x-ray detector that employs microphotonic light transmission devices.

With reference to FIG. 2, the curved detector array 20 is fabricated of a number of planar segments which abut one another to form the matrix of detection sites 22. Each segment comprises a scintillator 22 and a microphotonic routing matrix 44. The scintillator 42 is fabricated of any of several known designs for converting x-ray radiation into visible light. Current scintillator materials can be separated into a first class having fast detector characteristics with low light output and high radiation damage, and a second class of a fast detector with low transparency leading to z-axis non-uniformity. The scintillator 42 can be fabricated from multiple layers of scintillating material, thereby providing an optimal mix of scintillator material characteristics. As used herein a "scintillator" refers generically to any device that converts invisible radiation into light, and the term "light" includes infrared, visible and ultra-violet light.

The microphotonic routing matrix 44 is adjacent to the side of the scintillator which is remote from the x-ray source 12. The routing matrix 44 comprises tiny microelectronic switches which route the light from a plurality of detection sites in the scintillator to a common output optical conductor, as a consequence the routing matrix functions as an optical multiplexer. The microelectronic switches include moveable mirrors, which reflect the light along different paths, and optical gates which alternately permit or inhibit light to travel along a given path.

The microphotonic routing matrix 44 has a housing 46 which is bonded by a light transparent adhesive to the side of the scintillator 42 which is remote from the x-ray source 12. The housing 46 forms an internal cavity 48 which may be filled with a gas or optical transparent liquid. Within the cavity 48 which faces the scintillator 42. The cavity has a surface 50 facing the scintillator 42 which surface is formed by a semiconductor substrate 53 on which a two dimensional array of microelectromechanical (MEMS) steerable mirrors 52 are fabricated to form the optical switches. Each of those steerable mirrors 52 is individually controllable to reflect light emitted by the scintillator toward one side wall 60 of the housing 46.

Figure 4:
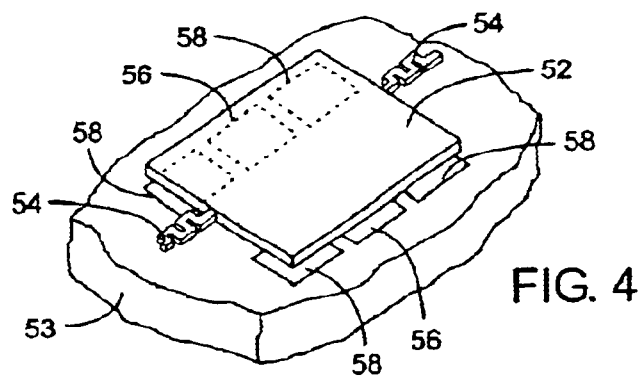
FIG. 4 illustrates one of the microphotonic light transmission devices.

With reference to FIG. 4, each steerable mirror 52 is suspended on a pair of springs 54 which support it at a nominal position parallel to surface 50. Planar actuator electrodes 56 form a pair of parallel plate capacitors with a conductive rear surface of the steerable mirror 52. The actuator electrodes 56 are arranged so that opposite polarity voltages on one side of the mirror apply a pulling deflection torque to the steerable mirror 52, while voltage is not being applied to the actuator electrodes 56 on the other side.

The actuator electrodes S6 and the conductive rear surface of the steerable mirror 52 are coupled to electrical conductors which extend through the semiconductor substrate 53 to connectors for wires from conventional microphotonic device control circuits (not shown). Those circuits apply a first relatively low frequency signal between the conductive rear surface of the steerable mirror 52 and the actuator electrodes 56. which produces a deflection of the steerable mirror as is conventionally known. The magnitude of the voltage applied to the actuator electrodes 56 determines the angle to which the steerable mirror 52 moves and thus the direction of the reflected light.

Position detection capacitors are formed with the conductive rear surface of the steerable mirror 52 by auxiliary electrodes 58 which also are connected to the conventional microphotonic device control circuits. The auxiliary electrodes 58 may be separate from actuator electrodes 56 or may be an extension thereof. A relatively high frequency signal is applied (from a signal generator, not shown) between the rear surface of the steerable mirror 52 and the auxiliary electrodes 58 to measure the capacitance there between. The magnitude of that capacitance is a function of the distance from the auxiliary electrodes 58 to the mirror's rear surface, which thus indicates the relative tilt position of the steerable mirror 52. Other well known devices, such as strain gauges, alternatively can provide an electrical signal indicating the mirror position. Whether or not the auxiliary electrodes 58 are joined to the actuator electrodes 37 (as may be advantageous in an integrated circuit embodiment), the position detection operation remains independent of the tilting function because the higher frequency signal used for position detection has substantially no effect on the mirror movement.

Figure 3:
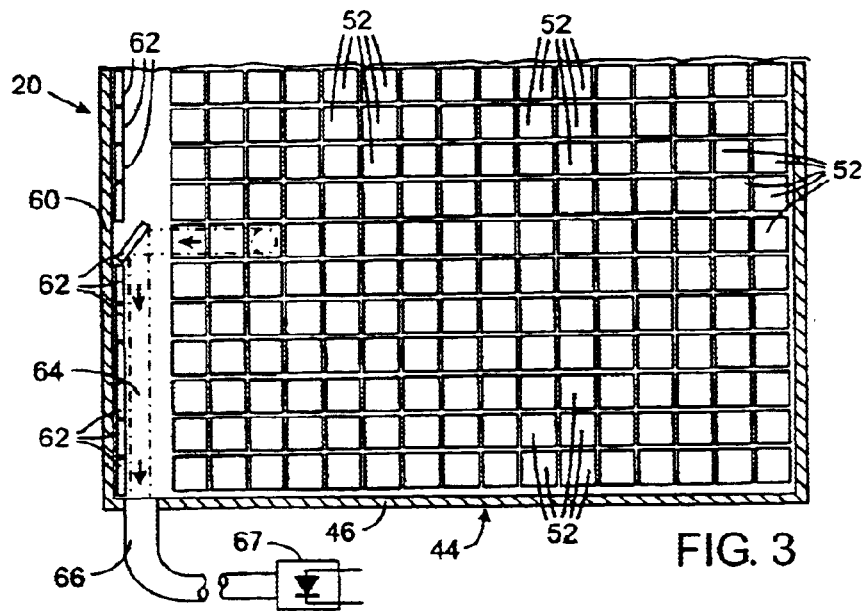
FIG. 3 depicts how light is routed from each detection site in the scintillator to a common optical transmission link.

With reference to FIGS. 2 and 3, in addition to the two dimensional array of the steerable mirrors 52 on the cavity surface 50, the microphotonic routing matrix 44 has a linear array of optical switches formed by a plurality of second steerable mirrors 62 mounted along the interior surface of the wall 60 within the cavity 48. Each of the second steerable mirrors 62 has a construction similar to that described with respect to the first mirrors 52.

As shown in FIG. 2. light emitted by the scintillator 42 travels downward in a plurality of input paths into the routing matrix 44, striking the mirrors 52. Most of the light beams along those input paths, such as beams 68, strike steerable mirrors 52 which are parallel to the surface 50 of the housing 46 and thus are orthogonal to the path of those light beams 68. As a consequence, these light beams 68 are reflected back along the respective input path toward the scintillator 42.

However, light beam 64 in FIG. 2 travels from the scintillator 42 into the microphotonic routing matrix 44 where that beam strikes a mirror 52 which has been tilted away from the surface 50. This tilted mirror reflects the light beam 64 toward the side wall 60 of the housing 46 where light beam impinges one the second mirrors 62 which has been tilted away from the side wall. As shown in FIG. 3, the tilted second mirror 62 reflects the light beam 64 in a path toward another wall of the housing 46, where the light beam travels along a single output path and passes through an housing opening into an optical conductor 66, such as a fiber optic cable.

Thus, of all the light beams traveling along the plurality of input paths of the routing matrix 44, only the single light beam 64 which impinges upon a tilted steerable mirror 52 is directed toward the second array of mirrors 62 and along the output path into the optical conductor 66. By selectively tilting each of the steerable mirrors 52 in a row of the routing matrix 44, light from each scintillator detector site associated with that row is sequentially transmitted through the optical conduit 66. Similarly, by selectively operating different ones of the second steerable mirrors 62, scintillator detection sites associated with other rows of the two-dimensional array of first steerable mirrors 52 can be selected for transmission into the optical conduit 66. In this manner, light from each of the detection sites is conveyed from the scintillator 42 into the optical conductor 66.

The optical conductor 33 leads to a single photodiode 67 which converts the transmitted light into an electrical signal which is applied as an input to the data acquisition system 36 in FIG. 1. Thus, only a single photodiode can be utilized to detect light over a entire segment of the x-ray detector 20. Furthermore, since the switching of each detector site is done optically, greater speed can be achieved than in prior x-ray detectors which utilized a two-dimensional array of photodiodes, i.e. one photodiode for each detection site and routed the signals through electrical switches.

Figure 5:
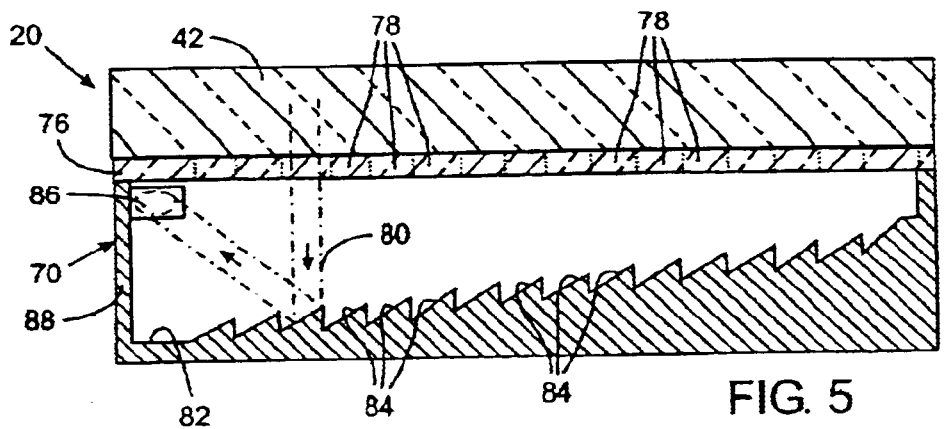
FIGS. 5 and 6 are cross sections through a second embodiment of an x-ray detector that employs another type of microphotonic light transmission devices.

FIG. 5 depicts an alternative embodiment of a microphotonic routing matrix 70 according to the present invention. In this embodiment, the scintillator 42 is bonded to a two-dimensional array 76 of optical gating elements 78, denoted by dotted lines. For example, the array 76 comprises a layer of liquid crystal material having different regions whose optical transmission characteristic is individually controllable by electrical signals to form the of optical gating elements 78. Thus, by selectively controlling the liquid crystal material at each optical gating element 78, light from a selected detection site in the scintillator can be transmitted through the routing matrix 70 as indicated by light beam 80. The two-dimensional array 76 of gating elements 78 perform the selection feature for a given detection site, instead of utilizing steerable mirrors 52 as in the first embodiment.

Figure 6:
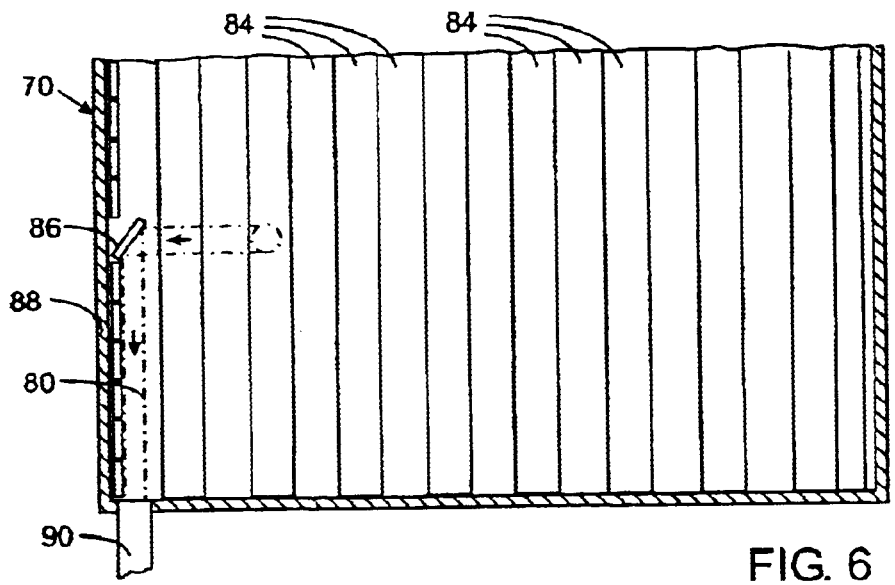

The selected light beam 80 impinges a surface 82 of the routing matrix 70 which has a plurality of mirrors 84 oriented at fixed angles. The angle of each mirror 84 is set to direct a light beam, traveling along the associated one of the first paths from the scintillator 42, toward a steerable mirror 86 on an end wall 88 of the microphotonic routing matrix 70. As shown in FIG. 6, activation of a particular steerable mirror 86 directs the light beam 80 toward the optical conduit 90 attached to the housing of the microphotonic routing matrix.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Specifically, other types of optical switching devices can be employed to direct the light beams through the microphotonic routing matrix. Accordingly, the scope of the invention should be determined from the following claims and not limited by the above disclosure.

What is claimed is:

1. A radiation detector for a imaging apparatus, said radiation detector comprising:
   a scintillator which converts one form of radiation into light; and
   an optical routing matrix adjacent to the scintillator to receive light along a plurality of input paths, the optical routing matrix having an output light path and a plurality of optical switches which are electrically operable to selectively direct light from each of the plurality of input paths into the output light path.

2. The radiation detector as recited in claim 1 further comprising an optical conduit coupled to the optical routing matrix to receive light traveling along the output light path.

3. The radiation detector as recited in claim 1 wherein the optical routing matrix comprises:
 a linear array of microelectromechanical mirrors each of which is independently movable to selectively direct light into the output light path; and
 a two-dimensional array of microelectromechanical mirrors, each of which is independently movable to selectively direct light from a different one of the input paths to the linear array of microelectromechanical mirrors.

4. The radiation detector as recited in claim 1 wherein each of the plurality of optical switches is selected from a group consisting of optical gating elements and microelectromechanical mirrors.

5. The radiation detector as recited in claim 1 wherein the scintillator converts x-rays into light.

6. An radiation detector for an imaging apparatus, said radiation detector comprising:
 a scintillator which converts invisible radiation into light;
 a first array of microphotonic switching devices adjacent to the scintillator wherein each one of the microphotonic switching devices receives light from a different section of the scintillator; and
 an optical conduit coupled to the first array of microphotonic switching devices;
 wherein each of the microphotonic switching devices is independently operable to selectively direct light from the respective section of the scintillator to the optical conduit.

7. The radiation detector as recited in claim 6 wherein the microphotonic switching devices comprise microelectromechanical switching elements.

8. The radiation detector as recited in claim 6 wherein the microphotonic switching devices comprise microelectromechanical mirrors.

9. The radiation detector as recited in claim 6 wherein the first array of microphotonic switching devices comprises:
 a semiconductor substrate;
 a plurality of electrically steerable mirrors;
 a plurality of springs coupling the plurality of electrically steerable mirrors to the semiconductor substrate; and
 an plurality of actuator electrodes on the semiconductor substrate, each of which is associated with a given steerable mirror for receiving a drive voltages which causes the given steerable mirror to move with respect to the semiconductor substrate.

10. The radiation detector as recited in claim 9 further comprising a sensor for detecting an amount that each of the plurality of electrically steerable mirrors moves with respect to the semiconductor substrate.

11. The radiation detector as recited in claim 6 wherein the microphotonic switching devices comprise light gating elements.

12. The radiation detector as recited in claim 11 wherein the light gating elements comprise liquid crystal material.

13. The radiation detector as recited in claim 6 wherein the first array comprises a two-dimensional array of microphotonic switching devices arranged in a plurality of rows.

14. The radiation detector as recited in claim 13 further comprising a second array of microphotonic switching devices, each being independently operable to selectively direct light from microphotonic switching devices in a row of the first array to the optical conduit.

15. The radiation detector as recited in claim 6 further comprising a semiconductor device connected to the optical conduit to convert the light into an electrical signal.

16. The radiation detector as recited in claim 6 wherein the scintillator converts x-rays into light.

17. An radiation detector for an imaging apparatus, said radiation detector comprising:
 a scintillator which converts invisible radiation into light;
 an optical conduit; and
 an optical routing matrix coupled to the scintillator and the optical conduit and defining a plurality of detection sites in the scintillator, said optical routing matrix having a plurality of optical switches, wherein each one is selectively operable to control flow of light from one of the detection sites to the optical conduit.

18. The radiation detector as recited in claim 17 wherein the plurality of optical switches comprise microelectromechanical switching elements.

19. The radiation detector as recited in claim 17 wherein the plurality of optical switches comprise microelectromechanical mirrors.

20. The radiation detector as recited in claim 17 wherein the plurality of optical switches comprise light gating elements.

21. The radiation detector as recited in claim 20 wherein the light gating elements comprise liquid crystal material.

22. The radiation detector as recited in claim 17 wherein the plurality of the plurality of optical switches are arranged in a two-dimensional array having a plurality of rows.

23. The radiation detector as recited in claim 22 wherein the optical routing matrix further comprises a linear array of optical switching elements, each of which is independently operable to selectively direct light from the optical switches in a row of the two-dimensional array to the optical conduit.

24. The radiation detector as recited in claim 17 wherein the optical routing matrix comprises:
 a linear array of microelectromechanical mirrors each of which is independently movable to selectively direct light into the optical conduit; and
 a two-dimensional array of microelectromechanical mirrors, each of which is independently movable to selectively direct light from a different region of the scintillator toward the linear array of microelectromechanical mirrors.

25. The radiation detector as recited in claim 17 wherein the optical switching matrix comprises:
 a semiconductor substrate;
 a plurality of steerable mirrors;
 a plurality of springs coupling the plurality of steerable mirrors to the semiconductor substrate; and
 an plurality of actuator electrodes on the semiconductor substrate, each of which is associated with a given steerable mirror for receiving a drive voltages which causes the given steerable mirror to move with respect to the semiconductor substrate.

26. The radiation detector as recited in claim 25 further comprising a sensor for detecting an amount that each of the plurality of steerable mirrors moves with respect to the semiconductor substrate.

27. The radiation detector as recited in claim 17 wherein the scintillator converts x-rays into light.

* * * * *